United States Patent Office 3,663,659
Patented May 16, 1972

3,663,659
PROCESS FOR THE PREPARATION OF HYDROXYLATED BLOCK POLYMERS
William C. Kray and De Loss E. Winkler, Emeryville, Calif., assignors to the United States of America as represented by the Secretary of Health, Education, and Welfare
No Drawing. Filed May 22, 1970, Ser. No. 39,888
Int. Cl. C08f 15/04, 27/00
U.S. Cl. 260—880 B
7 Claims

ABSTRACT OF THE DISCLOSURE

Elastic hydroxylated monovinyl arene-polydiene-monovinyl arene block copolymers are prepared by hydroboration and subsequent oxidation to the hydroxylated block copolymer. The hydrobromating agents include diborane, disiamylborane and 9-borabicyclo[3.3.1]nonane. These hydroxylated block copolymers have properties which are useful for reinforcing material for natural and synthetic rubber, for modification of rubber-based adhesives and due to their particular swellability for fabrication of devices for surgical implantation and for blood circulation in animals.

---

This invention is concerned with the production of certain selectively hydroborated and subsequently hydroxylated block polymers. More particularly, it is directed to the production of water swellable block copolymers containing hydroborate substituents and ultimately hydroxylated substituents in the elastomeric portions thereof, which maintain a high order of mechanical properties despite an ionic character and water content which improves their compatibility with the physiological environment. There is evidence in animals that these polyelectrolytes have greater compatibility with living tissue and blood than most other synthetic materials. This is probably due to their water content and ionic character which resembles biological material.

Three segment block copolymers, in which an elastomeric segment has attached at each end of it a segment of a glassy plastic polymer, have been shown to display rubber-like mechanical properties without chemical cross-linking with its irreversible effect on solubility and moldability. The properties of these so-called thermoplastic elastomers are explained in terms of entrapped chain entanglements in the elastomeric segment occurring as a result of the incompatibility of the end and center polymers. However, these materials are usually neutral and hydrophobic.

It is an object of the present invention to provide an elastomeric block copolymer with anionic substituents especially for fabrication of devices for surgical implantation and for blood circulation, as well as other applications demanding ionic characteristics, water swellability, and mechanical strength.

The general compositions and block polymers of the present invention are related in the prior patent art to the following:

3,265,765—Holden et al. (Shell)
3,299,174—Kuhre et al. (Shell)
3,326,881—Uraneck et al. (Phillips)
3,333,024—Haefele et al. (Shell)

These prior art patents have been utilized as reinforcing material for natural and synthetic rubbers, for modification of rubber-based adhesives, and for high impact plastics. The compositions and block polymers of the present invention possess similar present utility. Additionally, the compositions and block polymers of the present invention have special uses described supra due to their particular swellability in water. A summary of the class utilities for these compositions and polymers above is also found described in the Encyclopedia of Polymer Technology, volume 2, 1965, 485, 517 and 507. The subject of hydroboration and subsequent hydroxylation is covered in a monograph entitled Hydroboration, H. C. Brown, 1962 (W. A. Benjamin, Inc.).

In accordance with the present invention, novel elastomeric block copolymers are provided having a backbone consisting of selectively hydroxylated diene polymer block and two non-hydroxylated monovinyl arene polymer blocks. Further, in accordance with this invention, a process for selective hydroboration/hydroxylation of such polymers is provided wherein the ABA block copolymer is reacted with a hydroborating agent in the presence of a solvent and the organoborane is then cleaved off with alkaline peroxide and hydroxyl groups are substituted in the sites where the organoborane was positioned. Thus, hydroxyls, which are the sole substituents in the polymer, are directly attached in the diene block of the polymer; e.g., ABA, SIS, etc.

It has been found that this class of block copolymers, selectively hydroborated/hydroxylated in the conjugated diene block, exhibits highly desirable water swellability and retains useful, elastic mechanical properties despite the imbibition of large quantities of water. Since the monovinyl arene polymer blocks are substantially unaffected by the hydroboration process, the physically cross-linked structure characteristic of the parent hydrocarbon polymers in the solid-state are retained. Although hydroboration/hydroxylation renders a block polymer somewhat stiff in the absence of water, when a hydroxylated polymer is swollen with water, it has quite good mechanical properties. These properties, on water addition, make the polymers useful for artificial internal organs, blood pumps, and other artifact application in animals.

The block copolymers utilized in the formation of these selectively hydroborated/hydroxylated derivatives must have a block of a conjugated diene polymer or a partially hydrogenated conjugated diene polymer separating two blocks of a monovinyl arene polymer. The polymer configuration is expressed as ABA, in which the polymer blocks A comprise monovinyl arene polymer blocks, while B indicates a polymer block of a conjugated diene or a partially hydrogenated polymer block of a conjugated diene. Specific examples of such ternary polymer blocks are SIS, standing for polystyrene-polyisoprene-polystyrene, and SBS, standing for polystyrene-polybutadiene-polystyrene. Operably the blocks A above have average molecular weights between about 5,000 and about 75,000, while the polymer blocks B have average molecular weights between about 20,000 and about 250,000. Preferred average molecular weight range for A is about 5,000–35,000 where B is about 20,000 to 100,000. Furthermore, a narrow most preferred average molecular weight range for A is about 10,000–20,000 where B is about 30,000–75,000. Preparation of such polymers, such as the system polystyrene-polyisoprene-polystyrene, has been described in U.S. Pat. 3,265,765. By "partially hydrogenated" is meant that the conjugated diene double bonds are hydrogenated to the extent of 10–70% of the original diene unsaturation, which range is valid for the final hydroxylation of the present blocks with a preferred range of 10–20%.

The unsaturated block polymers of the present invention which have been hydroborated and subsequently hydroxylated obtained by the present process are subject to rapid oxidative degradation in air, therefore, they must be handled under anaerobic conditions and/or stabilized with anti-oxidants.

Ethers are preferred solvents utilized in this two-step reaction as solubilizing agents for the borated adduct. An optimum solvent is the cyclic ether tetrahydrofuran. Also operable is diglyme (DG or diethylene glycol dimethyl ether) or diethyl ether.

Applicability of hydroborating agents in the present invention is more specific than the solvent utilization described ante. With SIS, hydroboration and hydroxylation can be accomplished with any of the following three reagents without gel formation—borane, disiamyl borane, and 9-borabicyclo[3.3.1]nonane. However, with SBS, gel formation occurs when borane or disiamylborane is used, therefore, it is specific to use the 9-borabicyclo[3.3.1] nonane to prevent gel formation. Similarly, borane can only be used on BIB polymers after the B blocks have been hydrogenated.

In the alkaline oxidative cleavage of the organoborane to produce the alcohol, the oxidizing agent may be selected from inorganic and organic peroxides and hydroperoxides. An oxidizing agent of choice is hydrogen peroxide.

In the hydroborating step, temperature is controlled within about 25–60° C. for a reaction time of about 10 minutes to 5 hours, and in the hydroxylating step, the solution is made alkaline by appropriate base added in the cold at about 0° C., and preferably an oxidizing agent such as 30% aqueous $H_2O_2$ is added and the reaction is kept at about 15–25° C. Subsequent to the addition of hydrogen peroxide in medium cold, the solution mixture was then heated to about 50–60° C. and subsequently cooled and water coagulated.

EXAMPLE 1

Hydroboration-hydroxylation of polystyrene-polyisoprene-polystyrene (SIS) with diborane 10–30–10 SIS (molecular weight units: 10,000 polystyrene, 30,000 polyisoprene; 82 g.) was dissolved in tetrahydrofuran (THF; 1000 g.) and added at 0° C. to a solution of borane ($B_2H_6$, 9.646 g.) in THF (1038 g.). After the solution was heated for two hours at 30° C., the excess diborane deactivated by the slow addition at 0° C. of water (32 g.) in THF (100 g.). Then at 0° C., aqueous 3 M NaOH (240 ml.) was added and followed by the dropwise addition of aqueous 30% hydrogen peroxide ($H_2O_2$; 100 ml.). The reaction mixture was heated for 45 minutes at 50° C., cooled, and coagulated with water. The polymer crumb was then soaked in an aqueous 50% isopropyl alcohol solution, containing 0.25% 2,6-ditertiarybutyl-4-methylphenol (Ionol) followed by filtration and drying. Oxygen content 11.3%.

EXAMPLE 2

Hydroboration/hydroxylation of SIS with disiamylborane

16–68–16 SIS (72 g.) was dissolved in THF (1000 g.) and added at room temperature to a 1.0 M solution of disiamylborane (779 g.) in THF. After the solution was heated for two hours at 50–60° C., the excess disiamylborane was deactivated by the slow addition at 0° C. of water (20 g.) in THF (80 ml.). Then at 0° C., aqueous 3 M NaOH (260 ml.) was added and followed at 15–25° C. by the dropwise addition of 300 ml. of aqueous 30% $H_2O_2$ (300 ml.). The reaction mixture was heated for 30 minutes at 60° C., cooled and coagulated with water. The polymer crumb was then soaked in an aqueous 50% isopropyl alcohol solution containing 0.25% Ionol, followed by filtration and drying. Oxygen content 14.6%.

EXAMPLE 3

Hydroboration/hydroxylation of polystyrene - polybutadiene-polystyrene (PBS) with 9-borabicyclo[3.3.1] nonane (9-BBN)

14–72–14 SBS (35 g.) was dissolved in THF (600 ml.) and added at 0° C. to 0.60 moles of 9-BBN in THF (25% excess of 9-BBN). After the solution was heated for 15 minutes at 50° C., the excess 9-BBN was deactivated by the addition of 1-hexene (20 ml.), followed by heating for 15 minutes at 50° C. Then at 0° C., aqueous 3 M NaOH (240 ml.) was added followed at 20–25° C. by the dropwise addition of 30% $H_2O_2$ (280 ml.). The reaction mixture was heated for 30 minutes at 50° C., cooled, and coagulated with water. The polymer crumb was then soaked in an aqueous 50% isopropyl alcohol solution containing 0.25% Ionol, followed by filtration and drying. Oxygen content 18.6%.

EXAMPLE 4

Compounds prepared according to Examples 1–3 ante exhibited properties as follows when tested by the standard procedures (A) Solution properties—Hydroxylated SIS (11.3% oxygen) can be dissolved in solutions containing one part of water to nine parts of phenol, N,N-dimethylformamide, dioxane, or tetrahydrofuran. Heating up to 130° C. may be required to get the polymer into solution, however, it will remain in solution after cooling back down to room temperature.

(B) Absorption of organic solvents—Films (20 mils thick) of hydroxylated SIS (14.6% oxygen) were immersed in four common solvents for SIS for four hours at 25° C. The percent increased in weight $$\left(i.e., \frac{weight\ gain}{original\ weight} \times 100\right)$$

was as follows:

| Solvent: | Percent increase in weight |
|---|---|
| Cyclohexane | 3 |
| Toluene | 25 |
| Chloroform | 120 |
| Tetrahydrofuran | 220 |

(C) Absorption of water—Hydroxylated SIS (14.6% oxygen) will absorb variable amounts of water (7–160 parts per hundred parts of rubber—phr.) depending upon its previous history. Thus, films cast from dioxane readily absorb water while very little water is absorbed by films which had previously been soaked for several hours in ethanol and dried, i.e., two films were cast from dioxane. One film was soaked in ethanol (no treatment). Then each was soaked in water for three days and water absorption was measured.

| Sample: | Water absorbed (phr.) |
|---|---|
| Ethanol treated sample | 15 |
| Untreated sample | 125 |

(D) Tensile properties—Tensile properties were measured on wet and dry films of hydroxylated SIS (14.6% oxygen). The results follow:

| Water content, phr. | 0 | 41 |
|---|---|---|
| Tensile strength at break, p.s.i. | 3,800 | 3,100 |
| Modulus at: | | |
| 100% elongation | | 1,950 |
| 200% elongation | 1,550 | |
| Elongation at break, percent | 350 | 190 |
| Set at break, percent | 60 | 60 |

Antioxidant—Since the hydroxylated products of the present invention are subject to oxidation, it is preferable that a suitable antioxidant be included in storage of the product. Preferred antioxidants include para-amino phenols and most preferred are alkyl phenols substituted in the 2, 4 and 6 positions specially with a methyl group para, and at least one tert-butyl group ortho to the hydroxyl. Illustrative of preferred alkyl phenol antioxidants are BHA which is 2-tert-butyl-4-hydroxyanisole mixed with its isomer 3-tert-butyl-4-hydroxyanisole and BHT which is 2,6-di-tert-butyl-p-cresol, also known as butylated hydroxy toluene.

Additional examples showed that the original diene was oxygenated to about 10–70% with the blocks at the upper end of the scale showing increased brittleness. Preferred blocks were in the range 10–20% oxygenation based on the original diene structure.

The embodiments of the invention in which an exclusive property or privilege is claimed are defined as follows:

1. A process for the production of hydroxylated block copolymers ABA which comprise reacting a monovinyl arene-polydiene-monovinyl arene block copolymer in an ether solvent with a hydroborating agent selective for the polydiene at a temperature from about 25°–60° C. for a time of about 10 minutes to 5 hours, subsequently adding base at about 0° C. to achieve an alkaline pH and then selectively hydroxylating the polydiene by adding an aqueous peroxide at about 15–25° C. and recovering the hydroxylated block copolymer by heat/cool treatment and water addition wherein each monovinyl arene polymer block has an average molecular weight between about 5,000 and about 75,000 and the produced hydroxylated polydiene polymer block has an average molecular weight between about 20,000 and about 250,000 and the oxygen content in the selectively hydroxylated polydiene block ranges from about 10–70% based upon the original diene block.

2. A process according to claim 1 wherein the reactant block copolymer is polystyrene-polyisoprene-polystyrene (SIS).

3. The process according to claim 1 wherein the aqueous peroxide reactant is 30% aqueous hydrogen peroxide and the heat/cool treatment is achieved by heating the mixture to about 50–60° C., then subsequently cooling and coagulating by water addition.

4. A process according to claim 1 wherein the ether is tetrahydrofuran.

5. A process according to claim 1 wherein the hydroborating agent is diborane.

6. A process according to claim 1 wherein the hydroborating agent is disiamylborane.

7. The process according to claim 1 wherein the hydroborating agent is 9-borabicyclo[3.3.1]nonane.

References Cited
UNITED STATES PATENTS

| | | | |
|---|---|---|---|
| 3,078,309 | 2/1963 | Brown | 260—606.5 |
| 3,555,112 | 1/1971 | Winkler | 260—880 |

JAMES A. SEIDLECK, Primary Examiner

U.S. Cl. X.R.

260—94.7 A, 879